Patented Jan. 23, 1951

2,538,761

UNITED STATES PATENT OFFICE 2,538,761

COPOLYMER OF CHLOROMALEIC ANHYDRIDE AND UNSATURATED HYDROCARBONS CONTAINING ONE DOUBLE BOND

Paul G. Carpenter, Bartlesville, Okla., assignor to Hercules Powder Company, Wilmington, Del., a corporation of Delaware No Drawing. Application August 19, 1948, Serial No. 45,215

12 Claims. (Cl. 260—78.5)

This invention relates to new copolymers of chloromaleic anhydride and more particularly to copolymers of chloromaleic anhydride and aliphatic or cycloaliphatic monolefins which in themselves are not readily polymerized by peroxide catalysts.

In the past, maleic and chloromaleic anhydride have been copolymerized only with diolefins or olefins which are capable of polymerization with a peroxide catalyst. Maleic anhydride has been copolymerized with aliphatic monolefins, but it has not previously been possible to copolymerize substituted maleic anhydrides with olefins.

Now in accordance with this invention it has been found that chloromaleic anhydride may be copolymerized with aliphatic and cycloaliphatic monolefins, which in themselves are not readily polymerized by peroxide catalysts, by heating the two reactants in solution in the presence of a peroxide catalyst. These new copolymers have the unusual properties of being soluble in alkali and insoluble in aliphatic hydrocarbon solvents which make them of value in many applications where similar resinous copolymers cannot be used.

The following examples illustrate the preparation of these new copolymers. All parts and percentages are by weight unless otherwise specified.

Example 1

A mixture of 12.25 parts of purified chloromaleic anhydride, 10 parts of isobutylene, 0.5 part of benzoyl peroxide, and 20 parts of anhydrous toluene was heated in a sealed container to 50° C. for 16 hours. The reaction mixture was then dissolved in acetone and the copolymer was precipitated by addition of petroleum ether. The chloromaleic anhydride-isobutylene copolymer so obtained was soluble in benzene and dioxane and solutions of it in acetone or methyl ethyl ketone set to an insoluble gel on standing 24 hours. A yield of 12.4 parts of copolymer was obtained and the copolymer contained 16.5% chlorine, had a viscosity in 0.5% solution in acetone of 0.389 cps., and a relative viscosity of 1.288.

Example 2

Example 1 was repeated except that methyl ethyl ketone was used as the solvent in place of toluene. A yield of 14.2 parts of copolymer was obtained and the polymer had a chlorine content of 15.2%. It had the same solubilities as the product produced in Example 1.

Example 3

Forty parts of anhydrous benzene, in a reaction vessel equipped with a reflux condenser, an agitator, and a gas inlet, were saturated with propylene under a slight pressure at room temperature. To this solution was added a benzene solution containing 28 parts of purified chloromaleic anhydride and 1 part of benzoyl peroxide. The temperature was then raised to 50° C. and a slow stream of propylene was passed into the reaction mixture so that there was a pressure of propylene amounting to about 1 cm. of mercury. The reaction mixture was agitated and held at 50° C. for 20 hours. At the end of this time a gelatinous material had separated. Acetone was then added to dissolve the gelatinous material and the copolymer was precipitated from this solution by addition of petroleum ether. The product was a white material having a chlorine content of 17.2% and a relative viscosity in 0.5% solution in acetone of 1.02.

Example 4

A mixture of 20 parts of β-pinene, 10 parts of purified chloromaleic anhydride, 20 parts of anhydrous benzene, and 0.5 part of benzoyl peroxide was heated in a sealed container to 50° C. for 16 hours. The reaction mixture was then dissolved in acetone and the copolymer was precipitated by addition of petroleum ether. It was soluble in acetone, insoluble in petroleum ether, and had a relative viscosity in 0.5 solution in acetone of 1.03.

In accordance with this invention, chloromaleic anhydride may be copolymerized with aliphatic and cycloaliphatic monolefins by heating the two reactants together with a peroxide catalyst. One of the outstanding features of this invention is that it has been found possible to copolymerize chloromaleic anhydride with monolefins which are in themselves not polymerizable with peroxide catalysts. Examples of such olefins which may be copolymerized with chloromaleic anhydride in accordance with this invention are aliphatic monolefins such as propylene, butylene, isobutylene, diisobutylene, etc., and cycloaliphatic monolefins such as β-pinene.

Either chloromaleic acid, the esters thereof, or chloromaleic acid anhydride may be used to prepare the copolymers in accordance with this invention. In general, the anhydride is preferred. The chloromaleic acid, ester, or anhydride should be of high quality to obtain maximum yields and a high molecular weight copolymer. A technical grade chloromaleic anhydride should be purified by recrystallization or distillation before use.

The ratio of chloromaleic anhydride to olefin used in the preparation of these copolymers may be varied over a wide range. The higher the proportion of olefin the greater the proportion of olefin in the polymer and the higher the molecular weight. In fact, by using a large excess of olefin, the necessity of using an inert solvent may be eliminated. In general the ratio of chloromaleic compound to olefin may vary from about 1:1 to about 1:10 and preferably is from about 1:1 to about 1:2.

The copolymerization in accordance with this invention is readily carried out by heating the chloromaleic anhydride with the monoolefin in the presence of a peroxide catalyst. A solvent medium is desirable to facilitate the mixing of the materials and to assure uniform reaction. Only relatively small amounts of solvents are necessary since they are used primarily for convenience in handling the chloromaleic anhydride. Any solvent medium which is inert under the conditions of the reaction may be used as, for example, methyl ethyl ketone, aliphatic hydrocarbons such as hexane, aromatic hydrocarbons such as benzene, toluene, xylene, etc., dioxane, cyclohexanone, etc. The temperature at which the reaction is carried out will depend somewhat upon the other reaction conditions as, for example, the solvent used, etc. Usually a temperature of 50° C. is adequate, but higher temperatures may be used whereby the reaction is accelerated. In general, a temperature of from about 25° C. to about 100° C. and preferably about 30° C. to about 80° C. is used.

As already pointed out, the reaction is carried out in the presence of a peroxide catalyst. Any organic peroxide capable of furnishing free radicals may be used to catalyze the reaction as, for example, benzoyl peroxide, acetyl peroxide, ascaridole, lauroyl peroxide, cumene hydroperoxide, etc. The amount of catalyst used depends upon the other reaction conditions. Very low concentrations of catalyst are operable but to obtain the same yield as obtained when a larger amount of catalyst is used, a longer heating period is required. However, longer heating periods also tend to increase the molecular weight. In general, about 0.005 to about 0.1 mole of peroxide per mole of anhydride, and preferably from about 0.01 to 0.04 mole of peroxide per mole of anhydride, is used.

The time required for the reaction will vary with the temperature at which the reaction is carried out and the amount of catalyst used. For optimum yields and high molecular weight the reaction mixture is usually heated for about 8 to about 30 to 40 hours. Lower yields are obtained at less than 8 hours of heating unless a higher reaction temperature and higher concentration of catalyst are used. At a temperature of about 50° C. and a concentration of catalyst of about 0.02 mole of peroxide per mole of anhydride, a maximum yield of copolymer is obtained in about 16 hours of heating.

In general, the copolymerization reaction of this invention is carried out at atmospheric pressure or at autogenous pressure. High pressures are not required as may be seen from the foregoing examples wherein isobutylene was copolymerized with chloromaleic anhydride at autogenous pressure and propylene was copolymerized with chloromaleic anhydride by merely bubbling the propylene into a solution of the anhydride in the presence of a peroxide catalyst.

The new copolymers of chloromaleic anhydride and monoolefins are soluble in alkali and are insoluble in aliphatic hydrocarbon solvents such as petroleum ether, gasoline, etc. They are soluble in many organic solvents such as alcohols, ketones, ethers, chlorinated solvents and aromatic hydrocarbons and due to their film-forming properties are useful in plastics or protective coatings. Because of their solubility in alkali and the presence of such a large proportion of carboxyl groups, these new copolymers are of value as paper resins, emulsion stabilizers, emulsifying agents, and in protective coatings in which water-resistance is obtained by conversion to an insoluble salt.

These copolymers are unique in that they contain a very reactive tertiary chlorine atom. This reactive chlorine enables these polymers to take part directly in cross-linking reactions. Loss of the chlorine can cross-link the polymer chains directly or make it possible for the polymer to take part in other cross-linking reactions such as that with ketones.

The copolymers of chloromaleic anhydride and monoolefins can also split out hydrogen chloride whereby further unsaturation in the molecule is obtained. The additional double bond thus formed can then take part in vulcanizing reactions or in typical olefin reactions such as addition, hydrogenation, oxidation, etc. This dehydrohalogenation reaction may be carried out by dissolving or suspending the chlorine-containing polymer in a suitable solvent and removing hydrogen chloride by treatment with an alkaline reagent. The treatment may be carried out in water using inorganic bases, such as sodium or potassium hydroxide, sodium carbonate, etc., or in an organic solvent using organic bases, such as triethylamine, etc. In an aqueous system sufficient alkali must be used to react with the hydrogen halide that is split out as well as the carboxyl groups of the chloromaleic anhydride units present. The dehydrohalogenated polymer is readily precipitated from aqueous alkaline solutions by the addition of dilute acids and from organic solvents by the addition of hydrocarbons such as petroleum ether or hexane. The dehydrohalogenated polymers are stable to heat and light and consequently are of particular value in protective coatings. The introduction of a reactive double bond into the molecule also makes it possible to cross-link the polymers whereby the polymers are more resistant to organic solvents and alkalies.

The copolymers of chloromaleic anhydride and monoolefins may also be esterified to prepare copolymers which are less brittle than the unmodified copolymers and which consequently can be blended with other resins or plastics. The esterification may be carried out by simply refluxing the copolymer with the alcohol with or without an esterification catalyst or by heating a solution of the copolymer in the alcohol under pressure. The products obtained may be mono- or di-esters, depending upon the esterification conditions used. Any alcohol may be used for the esterification. Use of glycols or polyhydroxy compounds such as glycerine or pentaerythritol offers a ready means of obtaining cross-linked polymers which have greatly increased toughness and strength. Such products may then be used in plastics, lacquers, varnishes, adhesives and other protective coatings.

What I claim and desire to protect by Letters Patent is:

1. A copolymer of chloromaleic anhydride and an aliphatic monoolefin in a molar ratio of from about 1:1 to about 1:10.

2. A copolymer of chloromaleic anhydride and a cycloaliphatic unsaturated hydrocarbon containing only one double bond in a molar ratio of from about 1:1 to about 1:10.

3. A copolymer of chloromaleic anhydride and isobutylene in a molar ratio of from about 1:1 to about 1:10.

4. A copolymer of chloromaleic anhydride and propylene in a molar ratio of from about 1:1 to about 1:10.

5. A copolymer of chloromaleic anhydride and beta-pinene in a molar ratio of from about 1:1 to about 1:10.

6. The process of copolymerizing chloromaleic anhydride with an aliphatic monoolefin which comprises reacting the chloromaleic anhydride with said monoolefin in a molar ratio of from about 1:1 to about 1:10.

7. The process of copolymerizing chloromaleic anhydride with a cycloaliphatic unsaturated hydrocarbon containing only one double bond which comprises reacting the chloromaleic anhydride with said unsaturated hydrocarbon in a molar ratio of from about 1:1 to about 1:10 in the presence of a peroxide catalyst.

8. The process of copolymerizing chloromaleic anhydride and isobutylene which comprises heating a mixture of the two reactants in a molar ratio of from about 1:1 to about 1:10 in an inert solvent in the presence of a peroxide catalyst.

9. The process of copolymerizing chloromaleic anhydride and propylene which comprises heating a mixture of the two reactants in a molar ratio of from about 1:1 to about 1:10 in an inert solvent in the presence of a peroxide catalyst.

10. The process of copolymerizing chloromaleic anhydride and beta-pinene which comprises heating a mixture of the two reactants in a molar ratio of from about 1:1 to about 1:10 in an inert solvent in the presence of a peroxide catalyst.

11. A copolymer of chloromaleic anhydride and an unsaturated hydrocarbon in a molar ratio of from about 1:1 to about 1:10, said unsaturated hydrocarbon being selected from the group consisting of aliphatic and cycloaliphatic unsaturated hydrocarbons in which the unsaturation consists of a single double bond.

12. The process of copolymerizing chloromaleic anhydride with an unsaturated hydrocarbon selected from the group consisting of aliphatic and cycloaliphatic unsaturated hydrocarbons in which the unsaturation consists of a single double bond which comprises heating the chloromaleic anhydride with said unsaturated hydrocarbon in a molar ratio of from about 1:1 to about 1:10 in the presence of a peroxide catalyst.

PAUL G. CARPENTER.

REFERENCES CITED

The following references are of record in the file of this patent:

UNITED STATES PATENTS

| Number | Name | Date |
|---|---|---|
| 2,047,398 | Voss et al. | July 14, 1936 |
| 2,461,679 | Clifford et al. | Feb. 15, 1949 |

OTHER REFERENCES

Krczil, Kurzes Handbuch der Polymerisationstechnik, vol. 2, Leipzig, 1941, page 107.